US006227357B1

(12) United States Patent
Brown, Sr.

(10) Patent No.: US 6,227,357 B1
(45) Date of Patent: May 8, 2001

(54) AIR LIFT DEVICE

(76) Inventor: William L. Brown, Sr., 1014 N. Sanford Ave., Alma, MI (US) 48801

( * ) Notice: Subject to any disclaimer, the term of this patent is extended or adjusted under 35 U.S.C. 154(b) by 0 days.

(21) Appl. No.: 09/316,055

(22) Filed: May 21, 1999

Related U.S. Application Data

(60) Provisional application No. 60/088,552, filed on Jun. 9, 1998.

(51) Int. Cl.$^7$ .................................................. B65G 21/12

(52) U.S. Cl. .................................. 198/861.4; 198/861.1; 248/649; 248/654; 248/440

(58) Field of Search ............................ 198/861.1, 861.5; 248/649, 653, 654, 440, 188.91

(56) References Cited

U.S. PATENT DOCUMENTS 1,239,136 * 9/1917 Stone .................................. 248/649
3,183,016 * 5/1965 Gustafsson .
3,254,738 * 6/1966 Larsen .
3,348,678 * 10/1967 Flowers .
3,743,044 * 7/1973 Scheele .
3,854,610 * 12/1974 Carder ................................ 414/503
4,726,464 * 2/1988 Canziani ........................ 198/370.04
4,759,439 * 7/1988 Hartlepp .............................. 198/833
4,852,715 * 8/1989 Kmetz .............................. 198/369.2
4,890,420 * 1/1990 Azimi .................................. 451/273
5,161,670 * 11/1992 David .................................. 198/588
5,165,838 * 11/1992 Kallansrude et al. .
5,427,228 * 6/1995 Delsanto ............................. 198/586
5,570,604 * 11/1996 Fisch ................................ 72/405.02

* cited by examiner

*Primary Examiner*—Joseph E. Valenza
*Assistant Examiner*—Mark A. Deuble
(74) *Attorney, Agent, or Firm*—Tipton L. Randall

(57) ABSTRACT

The invention is a device, such as a chute or a conveyor belt, for receiving and transferring work pieces in a factory, mounted on a set of legs with lockable wheels at the bottom of each leg. Each leg is equipped with an hydraulic extension unit that is operated by air pressure. The air pressure is provided, for instance, from a machine, such as a press, that performs work on the work piece. Each leg is individually adjustable by the pneumatic extension unit, allowing the device atop the legs to be adjusted in height from the support surface, and maintained level or tilted from side to side or front to back. The wheels on the leg bottoms allow the device supported on the legs to easily move from one location to another on the factory floor. The legs may optionally be designed to fold up against the bottom of the supported device for ease of storage of the device.

The advantages of the height and level adjustable features of the work surface device include allowing workers of various stature to safely and comfortably handle work pieces. A single device can be height and level adjustable for each worker that uses the device.

23 Claims, 10 Drawing Sheets

AIR LIFT DEVICE

CROSS REFERENCE TO RELATED APPLICATION

This application claims the benefit under 35 U.S.C. §119 (e) of co-pending provisional application Ser. No. 60/088,552, filed Jun. 9, 1998. Application Ser. No. 60/088,552 is herein incorporated by reference.

FIELD OF THE INVENTION

The present invention relates to a device for adjusting both the height and side to side orientation of a work surface or similar piece of equipment relative to the support surface on which the device is located.

BACKGROUND OF THE INVENTION

In the modern manufacturing workplace, individual workers are often required to perform repetitive tasks while positioned at a specific location. The worker may have a particular work surface at which to perform the repetitive task. The manufacturing facilities often operate continuously with one or more worker at each work station during each shift of operation. A particular work station work surface may not be suited to the stature of all works who perform tasks at that station. When performing repetitive tasks, such as handling heavy work pieces, the worker may experience physical discomfort or injury when the work surface is not matched to the stature of that worker. Providing a customized work surface for each worker at a work station is economically prohibitive. Thus, there is an unmet need for a device which can be individually adjusted for the needs of each worker who performs tasks at a particular work station work surface.

A number of patents concerned with devices that can adjust the height of a work surface or similar structure have been granted.

Feiertag, in U.S. Pat. No. 3,820,176, discloses a patient handling table that employs a combination of a hydraulic cylinder and cable with pulleys to raise, lower and tilt the table to from end to end.

Hinman, in U.S. Pat. No. 3,827,663, shows a spring loaded, self adjusting furniture support to accommodate uneven surfaces.

Dufrancatel, in U.S. Pat. No. 4,396,222, discloses a trailer with adjustable interior components.

In U.S. Pat. No. 4,441,432, Carlton shows a tilting table top with pins mounted in horizontal slots and in angled slots with notches to allow tilting of the table top.

Vertically adjustable tables are disclosed by de la Haye in U.S. Pat. No. 4,615,279 and by Peterson et al in U.S. Pat. No. 4,828,208. Both patents describe mechanical gearing to adjust a table top surface.

In U.S. Pat. No. 4,944,366, Pryor et al. disclose a pneumatic operated scaffolding to lift sheet rock for ceiling joist attachment. The scaffolding contains four legs with pneumatic cylinders for raising a work support frame. The pneumatic cylinders are removable from the support frame for transport.

U.S. Pat. No. 5,531,413 by Wolf et al. discloses a pneumatic or hydropneumatic length adjusting cylinder for chairs, tables and the like, designed to prevent twisting.

Jonker, in U.S. Pat. No. 5,598,788, describes an adjustable height table with two leg supports. Each leg has a gas spring that resists movement and a ratcheting latch mechanism to maintain a selected table height.

In U.S. Pat. No. 5,615,451, Peterson et al. describe a roller assembly that pivots between up and down positions to elevate or lower an attached table. The roller assembly allows the table to be rolled between locations and set in position with the roller assembly retracted.

In U.S. Pat. No. 5,161,868, Hooser discloses a telephone table with locking casters and means for elevating the table top. The elevating means may be four electrical stepping motors, each of which rotate a threaded shaft in one leg, or a central hydraulic lift cylinder with four hydraulic power cylinders for tilting the table top. The hydraulic system requires an electrical pump to power the system. The stepping motors are controlled in pairs to allow the table top to be tilted from front to back.

Zeiner, in U.S. Pat. No. 5,437,236, describes a rectangular table with a similar base support. A central cylindrical support is fitted with an air pump to cause the cylinder to elevate the table top. Two to four telescoping legs, each with set screws, are positioned to support the table top.

SUMMARY OF THE INVENTION

The invention is an elevational and tilt adjustable work surface device comprising a generally planar work surface member with top and bottom surfaces. A plurality of height adjusting leg members are secured to the bottom surface of the work surface member. The height adjusting leg member comprise a bracket member secured to the work surface member bottom side, with a telescoping support member oriented generally perpendicular to the work surface member and fastened at a first support member end to the bracket member. The telescoping support member is preferably a gas shock cylinder member, connected to a supply means for delivery of compressed gas thereto. A rigid leg member is attached to the telescoping support member second end opposite the bracket member. Individual control means for admitting gas to or releasing gas from the gas supply means connected to the individual gas shock cylinder members is secured to the work surface device, whereby each height adjusting leg member is independently height adjustable by the individual control means, thereby providing an elevational and tilt adjustable work surface member.

The work surface member may be as simple as a chute to collect and store work pieces or transfer work pieces from one location to another. Alternatively, the work surface member may be relatively complex, such as a conveyor belt with associated power motor, where the belt moves by means of the motor to transport work pieces from point to point.

BRIEF DESCRIPTION OF THE DRAWINGS

Reference is next made to a brief description of the drawings, which are intended to illustrate the preferred embodiment of the present invention with respect to the manner of making and using the same in its presently understood best mode. The drawings and the detailed description which follow are intended to be merely illustrative and not otherwise limiting of the scope of the invention as set forth in the appended claims.

DESCRIPTION OF THE PREFERRED EMBODIMENT

Nomenclature

Figure 1:
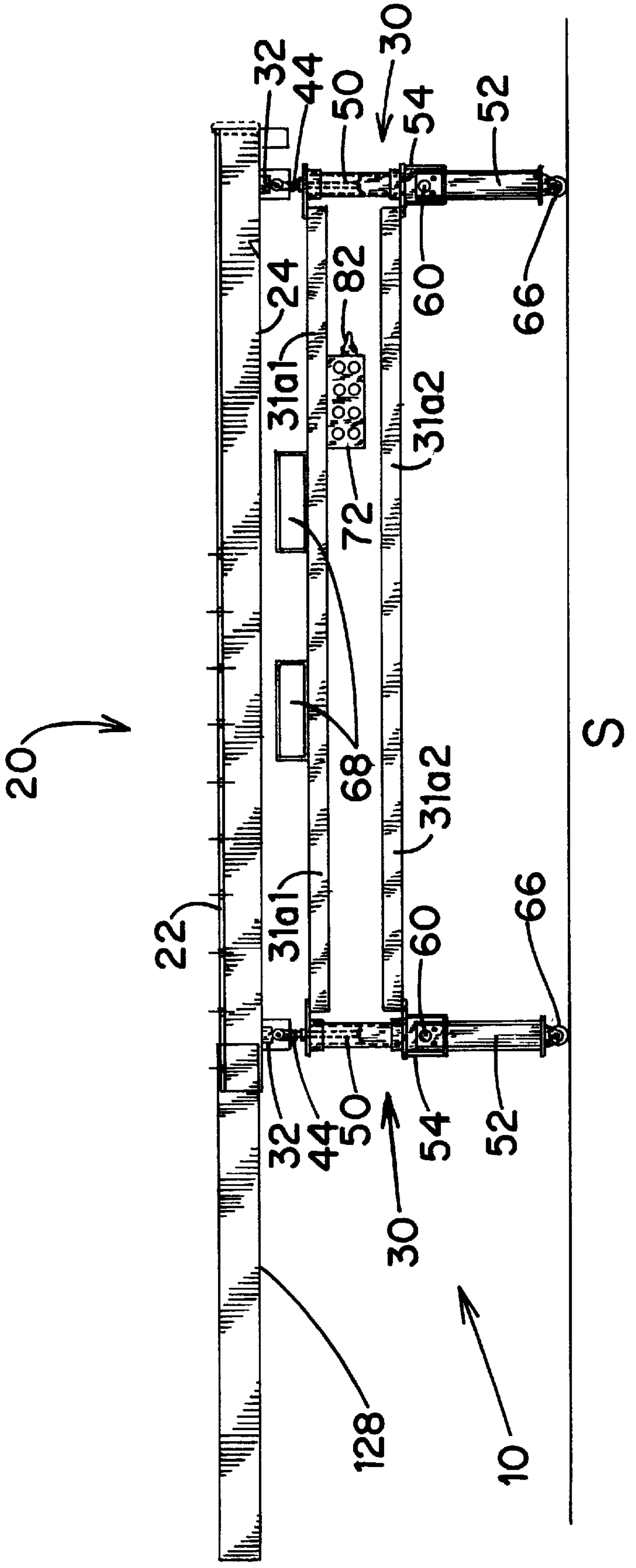
FIG. 1 is a side plan view of the adjustable work surface device of the present invention.
Figure 2:
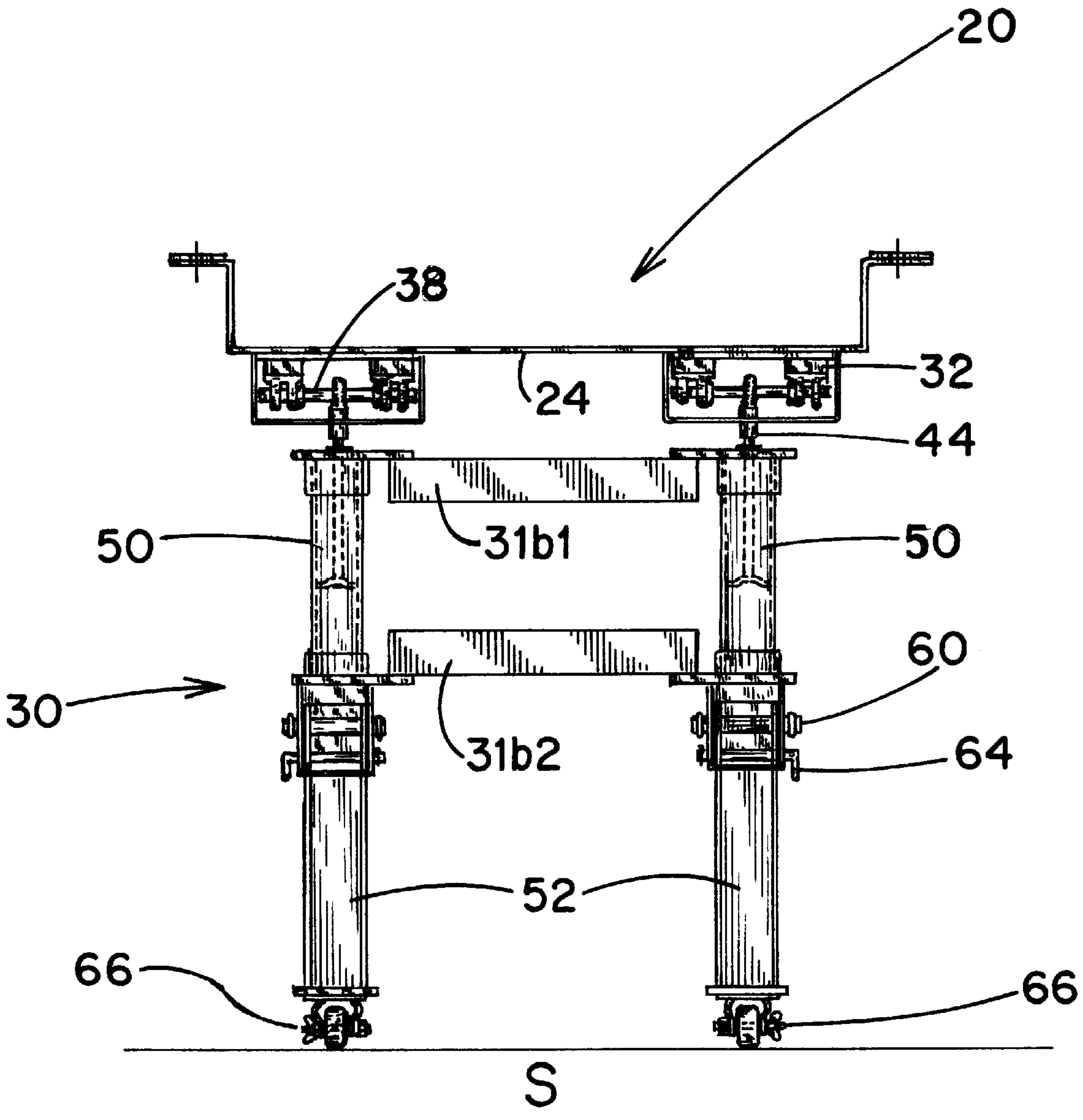
FIG. 2 is an end view of the adjustable work surface device.

| S | Support Surface |
|---|---|
| 10 | Adjustable Work Surface Device |
| 20 | Planar Rectangular Work Surface Member |
| 22 | Top Side of Work Surface Member |
| 24 | Bottom Side of Work Surface Member |
| 30 | Height Adjusting Leg Member |
| 31 | Bracing Members |
| 32 | Bracket Member |
| 34 | Circular Fastener Members |
| 36 | Aperture in Circular Fastener Member |
| 38 | Retaining Rod Member |
| 40 | Hollow Cylindrical Collar Member |
| 42 | Fastening Screw Member |
| 44 | Tie Rod Member |
| 46 | Hollow Cylindrical Rubber Bushing Member |
| 50 | Telescoping Support Member |
| 51 | Expandable Dust Boot Member |
| 52 | Rigid Leg Member |
| 54 | Lockable Pivot Member |
| 56 | Top Portion of Pivot Member |
| 58 | Leg Sections of Pivot Member |
| 60 | Pivot Pin Member |
| 62 | Leg Stop Member |
| 64 | Locking Pin Member |
| 66 | Lockable Wheeled Castor Member |
| 68 | Fork Lift Bracket Member |
| 70 | Compressed Gas Conduit Member for Individual Gas Shock Cylinder |
| 72 | Pneumatic Control Device |
| 74 | Bracket Holder for Pneumatic Control |
| 78 | Control Switch Members |
| 80 | Gas Manifold Channel |
| 81 | Body Member of Pneumatic Control Device |
| 82 | Gas Inlet Connector Member |
| 84 | Gas Inlet Tank Valve Member |
| 86 | Gas Supply Channel |
| 88 | Coupler Plug Member |
| 90 | Gas Outlet Channel |
| 92 | Compressed Gas Source |
| 94 | Main Gas Supply Conduit Member |
| 96 | Compressed Gas Cylinder |
| 100 | Machine Control Device |
| 102 | Control Conduit Line Member for Machine |
| 104 | Bracket Member for Machine Control Device |
| 106 | Lock Pin Member of Bracket Member |
| 120 | Chute Device |
| 122 | Horizontal Bottom Work Surface of Chute |
| 124 | Vertical Side Members of Chute |
| 126 | Vertical End Members of Chute |
| 128 | Extension Surface Member |
| 150 | Conveyor Belt Device |
| 152 | Roller Members of Conveyor |
| 154 | Continuous Belt Member of Conveyor |
| 156 | Motor Member for Driving Conveyor Device |
| 158 | Switch Member for Motor |

Construction

Referring to FIGS. 1–4, the elevational and tilt adjustable work surface device 10 of the present invention is shown. The device 10 includes a generally planar and rectangular work surface member 20 with a top side 22 and a bottom side 24. The work surface member 20 is depicted as a simple container for purposes of explanation, although a variety of work surface members capable of multiple functions are contemplated. These embodiments will be described in detail later.

The planar rectangular work surface member 20 is oriented parallel to a supporting surface S, such as a floor in a manufacturing facility. The planar rectangular work surface member 20 is supported by a plurality of height adjusting leg members 30 secured to the bottom side 24 of the planar rectangular work surface member 20. A minimum of three leg members 30 are required to suppor the work surface member 20. Preferably at least four leg members 30 are secured to the planar rectangular work surface member 20 with the leg members 30 positioned roughly at the corners thereof. The leg member 30 are also maintained perpendicular to the work surface bottom side 24 by a plurality of bracing members 31 fastened between adjacent leg members 30. With three leg members 30 present, one bracing member 31 connected between adjacent leg member 30 requires a total of three bracing members 31. As seen in FIGS. 1–4, each of the preferred four leg members 30 is connected to the two adjacent leg members 30 by two pairs of bracing members 31*a* and 31*b*, with one bracing member of the pair, 31*a*1, positioned above the other brace member 31*a*2, of the pair. Thus, each leg member 30 has a total of four brace members, 31*a*1, 31*a*2, 31*b*1 and 31*b*2, connected to adjacent leg members 30. This construction provides a rigid base for elevating the rectangular work surface member 20 by means of the height adjusting leg members 30.

Figure 5:
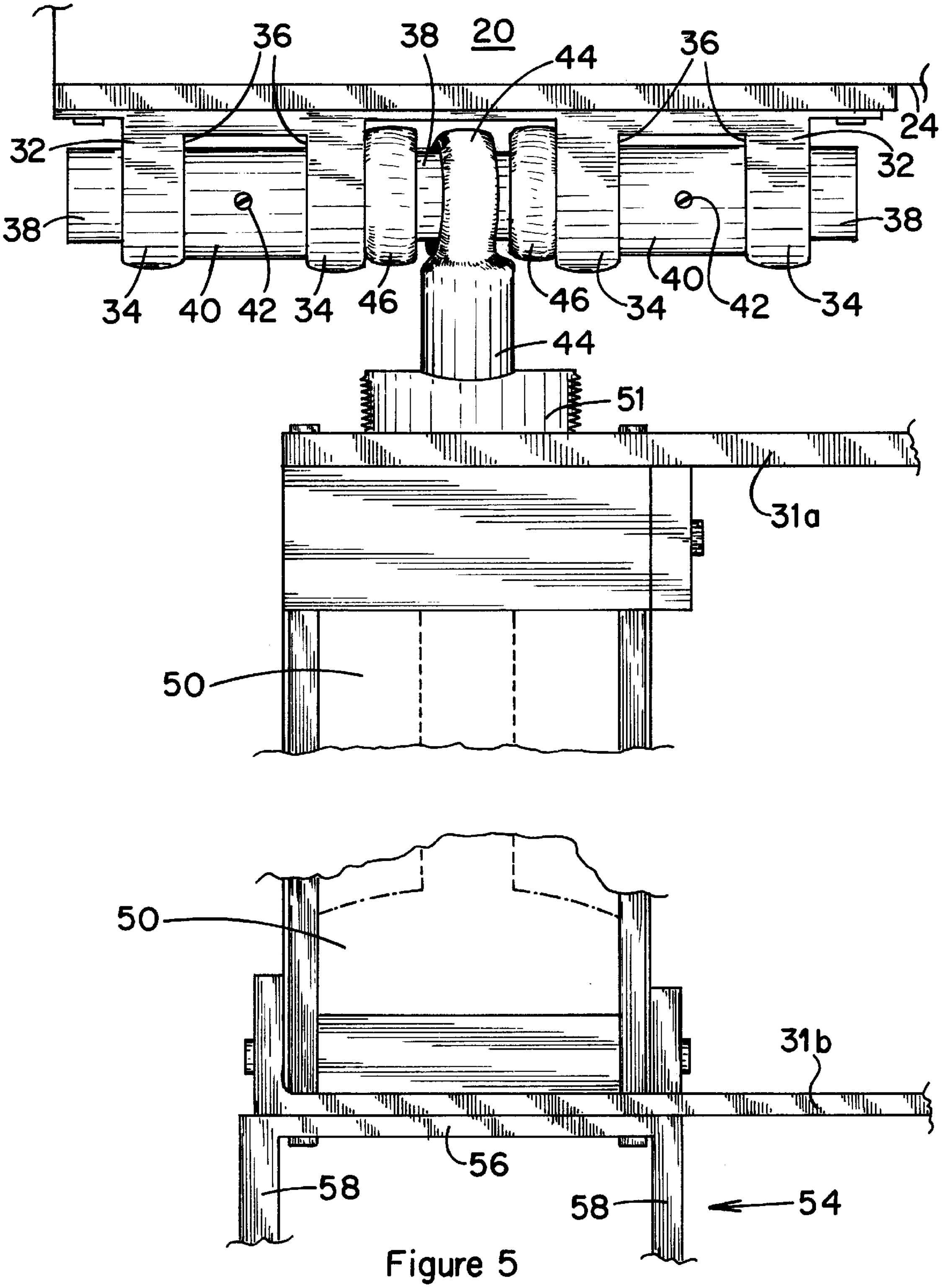
FIG. 5 is a side plan view of the upper portion of the height adjusting leg member.

The height adjusting leg members 30 are each comprised of a bracket member 32 secured to the bottom side 24 of the work surface member 20. The upper portion of the leg members 30 is shown in grater detail in FIG. 5. Referring to FIG. 5, the bracket member 32 includes two pairs of circular fastener members 34 with interior apertures 36. The fastener members 34 are aligned such that a retaining rod member 38 can extend through all fastener member apertures 36. A hollow cylindrical collar member 40 is positioned between each pair of circular fastener members 34 with the retaining rod member 38 passing through each collar member 40. A fastening screw member 42 secures each collar member 40 to the rod member 38. One end of a tie rod member 44 is located between the pair of fasteners 34 with the rod member 38 passing through an aperture in the end of the tie rod member 44. A pair of hollow cylindrical rubber bushing member 46 are positioned on the rod member 38, one bushing member 46 on each side of the end of the tie rod member 44, and between the pairs of fastener member 34. The rubber bushing members 46 allow the tie rod member 44 to swivel slightly on the rod member 38, but prevent damage to the tie rod member 44 and adjacent fastener members 34. The tie rod member 44 is part of a telescoping support member 50 providing height adjustment of the leg member 30.

Figure 6:
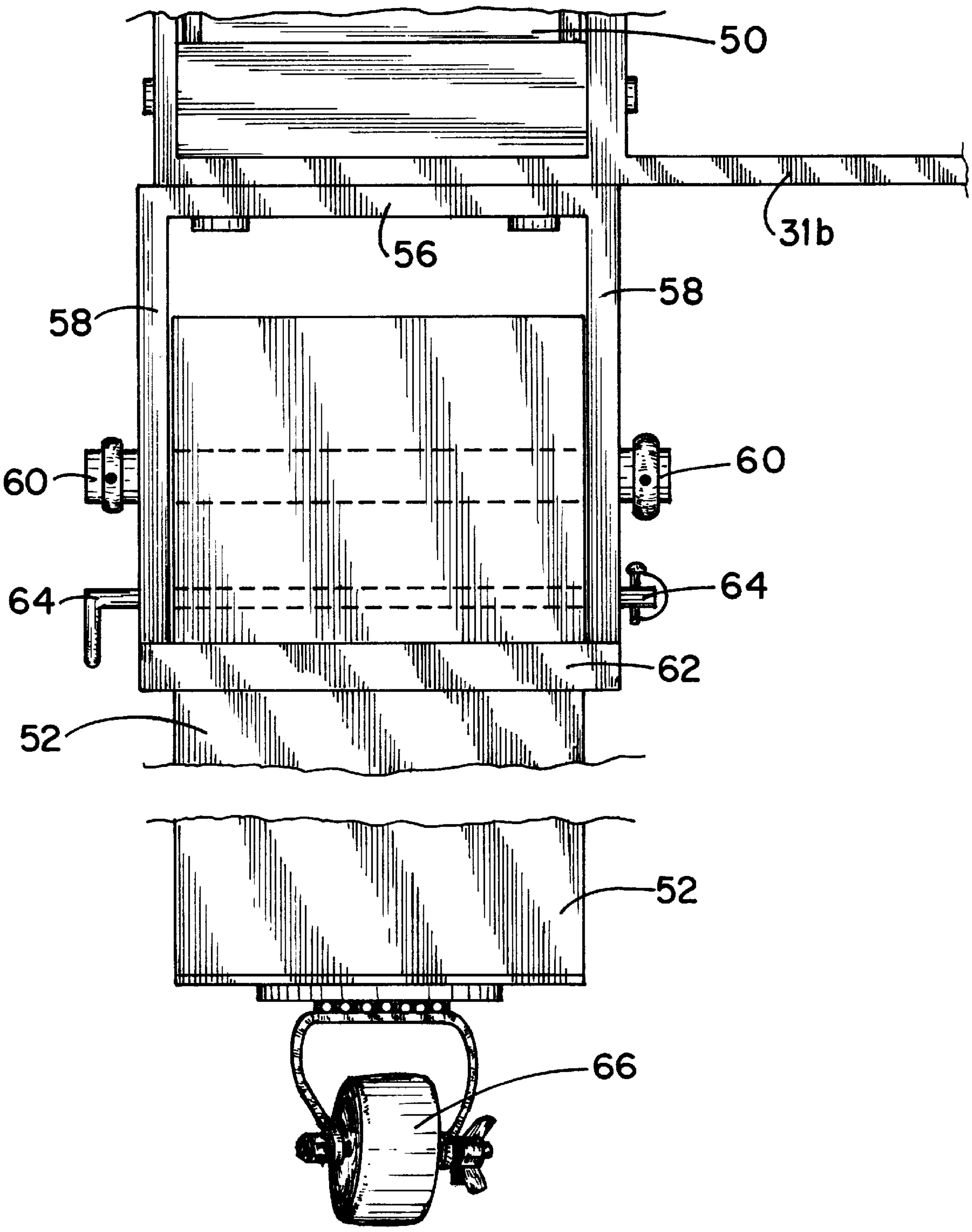
FIG. 6 is a side plan view of the lower portion of the height adjusting leg member.

The telescoping support member 50 extending from each bracket member 32 is oriented generally perpendicular to the work surface member 20 and fastened to the bracket member 32 through the tie rod member 44. The telescoping support member 50, preferably a gas shock cylinder member, expands and contracts by pressurized gas, thereby moving the tie rod member 44 away from or toward the support member 50. The pairs of bracing members, 31*a* and 31*b*, are secured to the top and bottom of the telescoping support member 50 with each pair of bracing members fastened to an adjacent telescoping support member 50. The bracing members 31 are preferably rigid steel material. An expandable dust boot member 51, made of natural or synthetic polymer, encircles the tie rod member 44 at the point the tie rod member 44 enters the telescoping support member 50. Suitable support material fastens the telescoping support member 50 and the bracing pairs 31*a,* 31*b*. The end of the telescoping support member 50 opposite the tie rod member 44 is connected to a rigid leg member 52 through a lockable pivot member 54. FIG. 6 is a close up view of the lower portion of the height adjustable leg member 30 viewed from the perspective of FIGS. 2 and 3. The box-like U-shaped pivot member 54 includes a transverse top portion 56 with opposing leg sections 58. The U-shaped member 54 is secured at the transverse top portion 56 to the telescoping support member 50 and attached bracket members 31*b* opposite the tie rod member 44, and is sized to accept the rigid leg member 52 between the opposing leg members 58. A pivot pin member 60 extends through each opposing leg sections 58 and through the rigid leg member 52 positioned there between, allowing the leg member 52 to pivot. The rigid leg member 52 is preferably a hollow rectangular steel tube. Pivoting of the leg member 52 is limited to one direction by means of a leg stop member 62 secured to one edge surface of each leg sections 58. A locking pin member 64 is present in the pivot member 54 which reversibly locks the rigid leg member 52 in the perpendicular orientation. The locking pin member 64 fits into a pair of aligned apertures, one in each opposing leg member 58 of the pivot member 55. The portion of the leg member 52 positioned within the pivot member 54 contains two sets of apertures as well. One set aligns with the locking pin apertures with the leg member 52 in a vertical orientation, while the other set of apertures aligns with the locking pin apertures with the leg member 52 in a horizontal orientation. The locking pin member 64 is inserted through the appropriately aligned apertures to lock the leg member 52 in the desired orientation.

The ends of the rigid leg members 52 opposite the telescoping support member 50 may rest directly upon the supporting surface S. However, it is preferred that a lockable wheeled castor member 66 be secured at the end of each rigid leg members 52 opposite the telescoping support member 50. Thus, the plurality of height adjusting leg members 30 secured to the planar rectangular work surface member bottom side 24 each preferably have a lockable wheeled castor member 66 attached thereto, allowing the adjustable work surface device 10 to be positioned at one location, and then conveniently rolled to another location.

Figure 3:
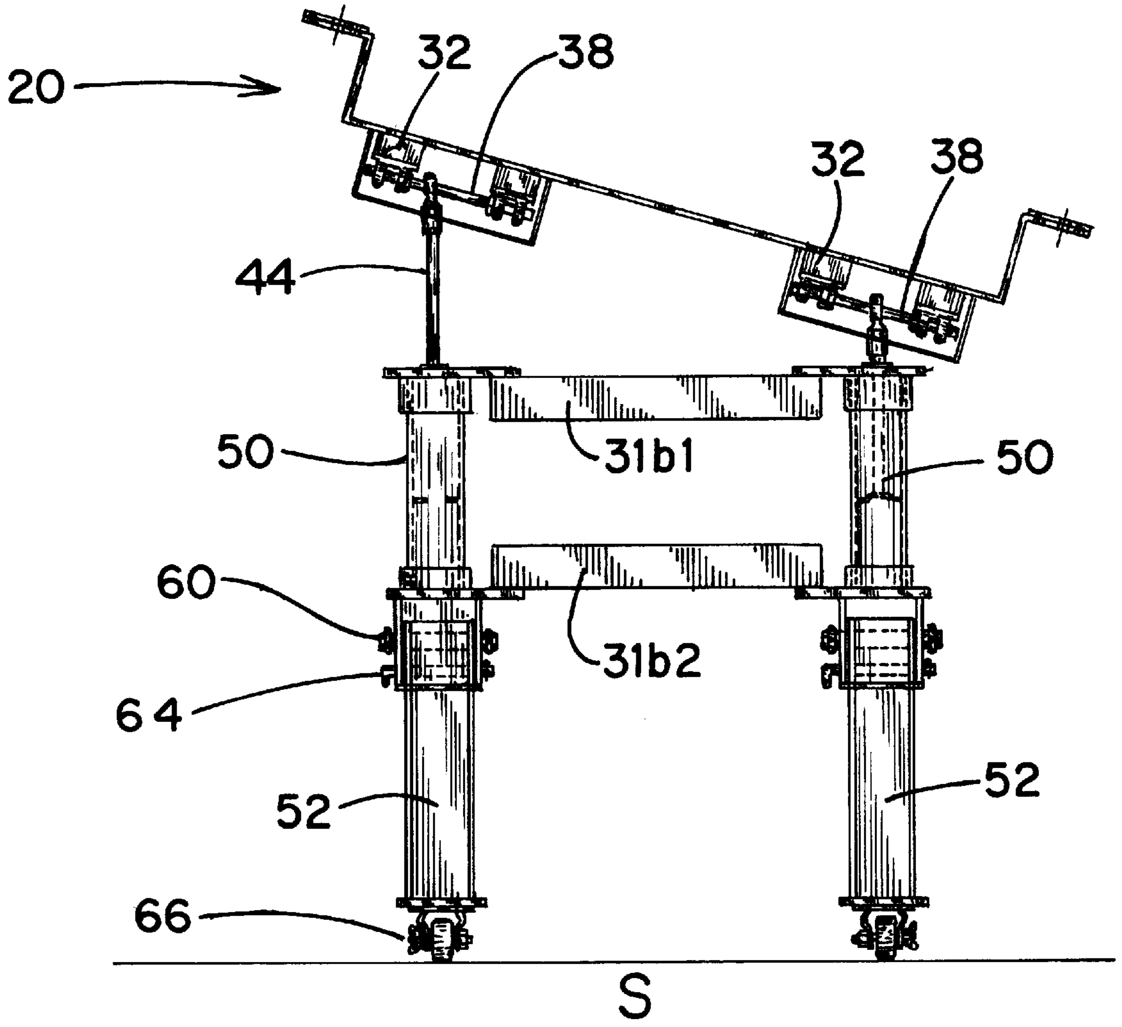
FIG. 3 is a side plan view of the device with one end of the work surface elevated.
Figure 4:
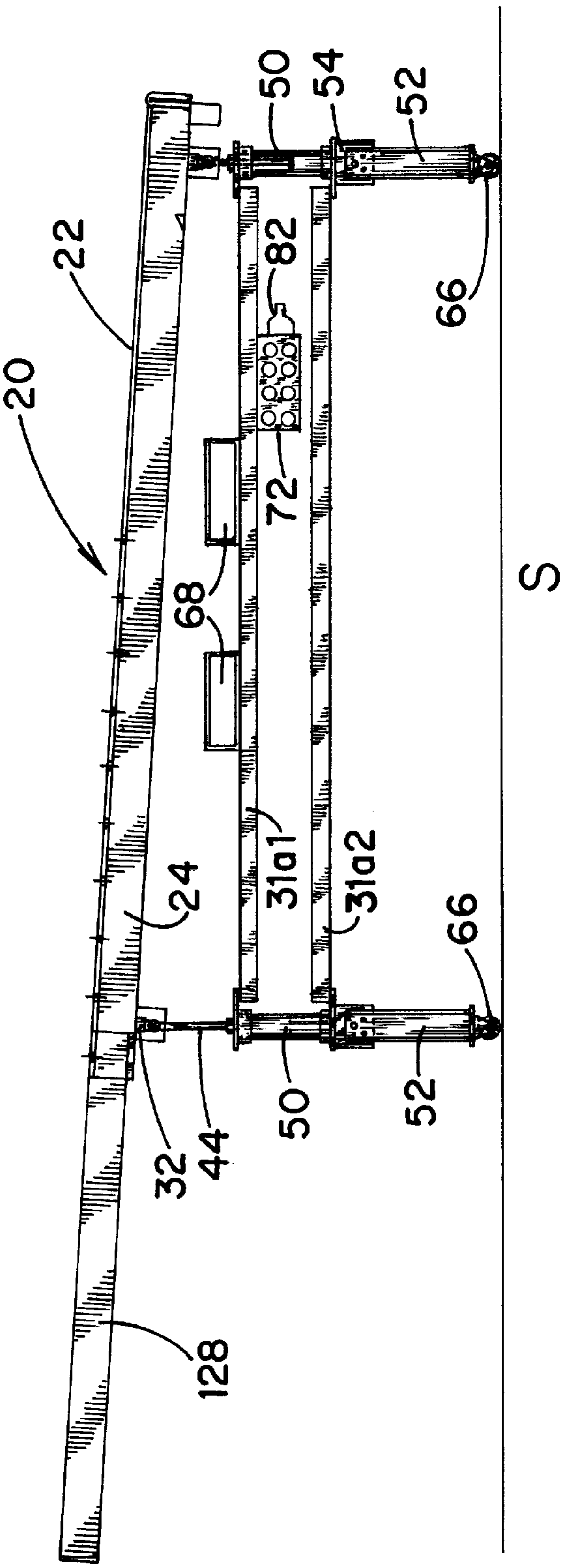
FIG. 4 is an end view of the device with the work surface tilted to one side.

Further, the pivotally fastened rigid leg members 52 each can be unlocked and pivoted about each pivot member 54 from a vertical orientation to a parallel orientation relative to the work surface member 20. Preferably, the rigid leg members 52 remain beneath the external limits of the work surface member 20 when pivoted to a horizontal orientation. The pivot point for the rigid leg members 52 is located in the pivot member 54, a selected distance from the planar work surface member bottom side 24. Several fork lift bracket members 68 may be fastened to the bracket members 31 as seen in FIG. 3. The tines of a fork lift are inserted into the bracket members 68 for lifting and transporting the device 10. The whole adjustable work surface device 10, with the rigid leg members 52 folded to a horizontal orientation, may be stacked by use of a fork lift or similar means when the unit is not in use.

The telescoping support member 50 of each height adjusting leg member 30 is supplied and powered with compressed gas delivered by an individual compressed gas conduit member 70. The conduit member 70 preferably is a flexible hose member, or similar flexible conduit, which connects each telescoping support member 50 with a pneumatic control device 72 mounted by means of a bracket holder member 74 secured to one or more of the bracing members 31. The individual compressed gas conduit members 70 are preferably fastened to the bracing members 31 of the work surface device 10 and are attached to each telescoping support member 50.

Figure 7:
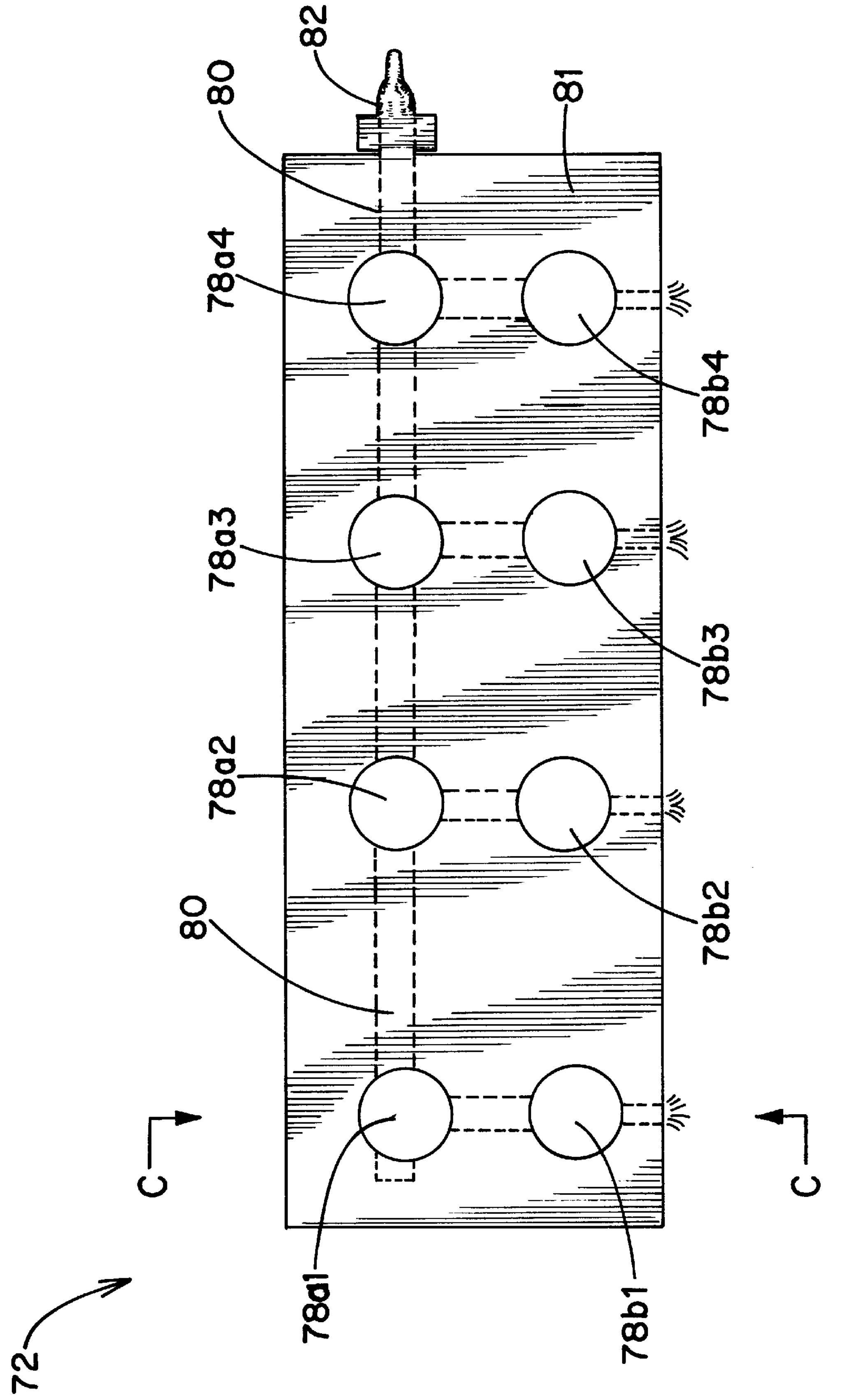
FIG. 7 is a side plan view of the pneumatic control device of the present invention.
Figure 8:
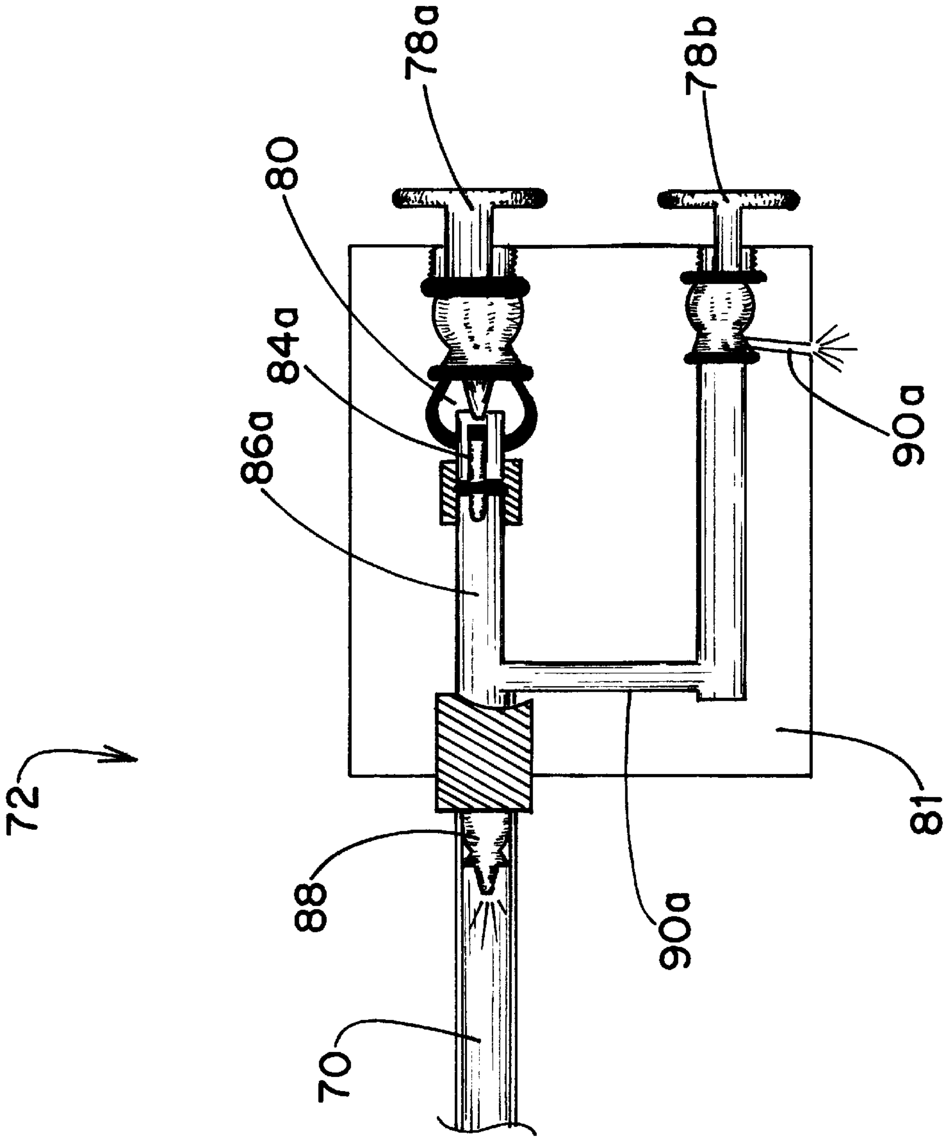
FIG. 8 is a cross sectional view of the pneumatic control device along line C—C of FIG. 7.
Figure 9:
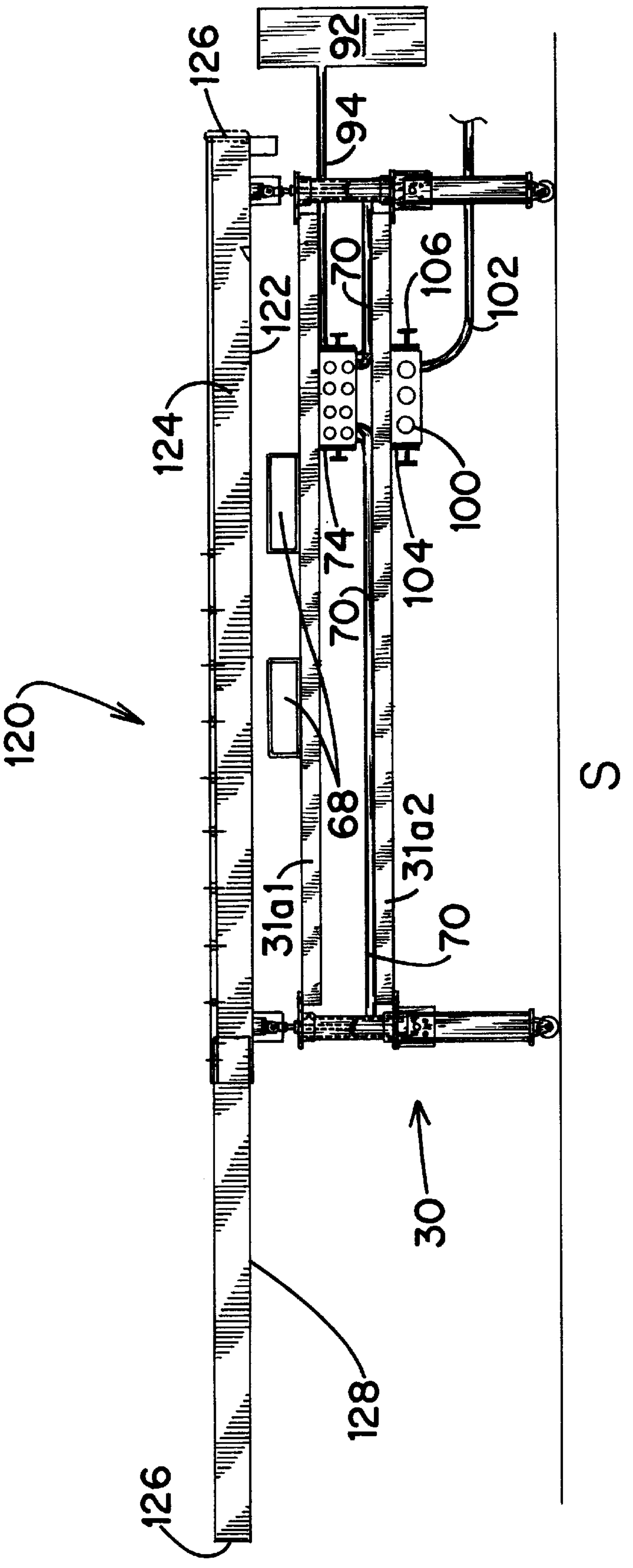
FIG. 9 is a side plan view of the adjustable work surface device connected to a compressed gas supply source.
Figure 10:
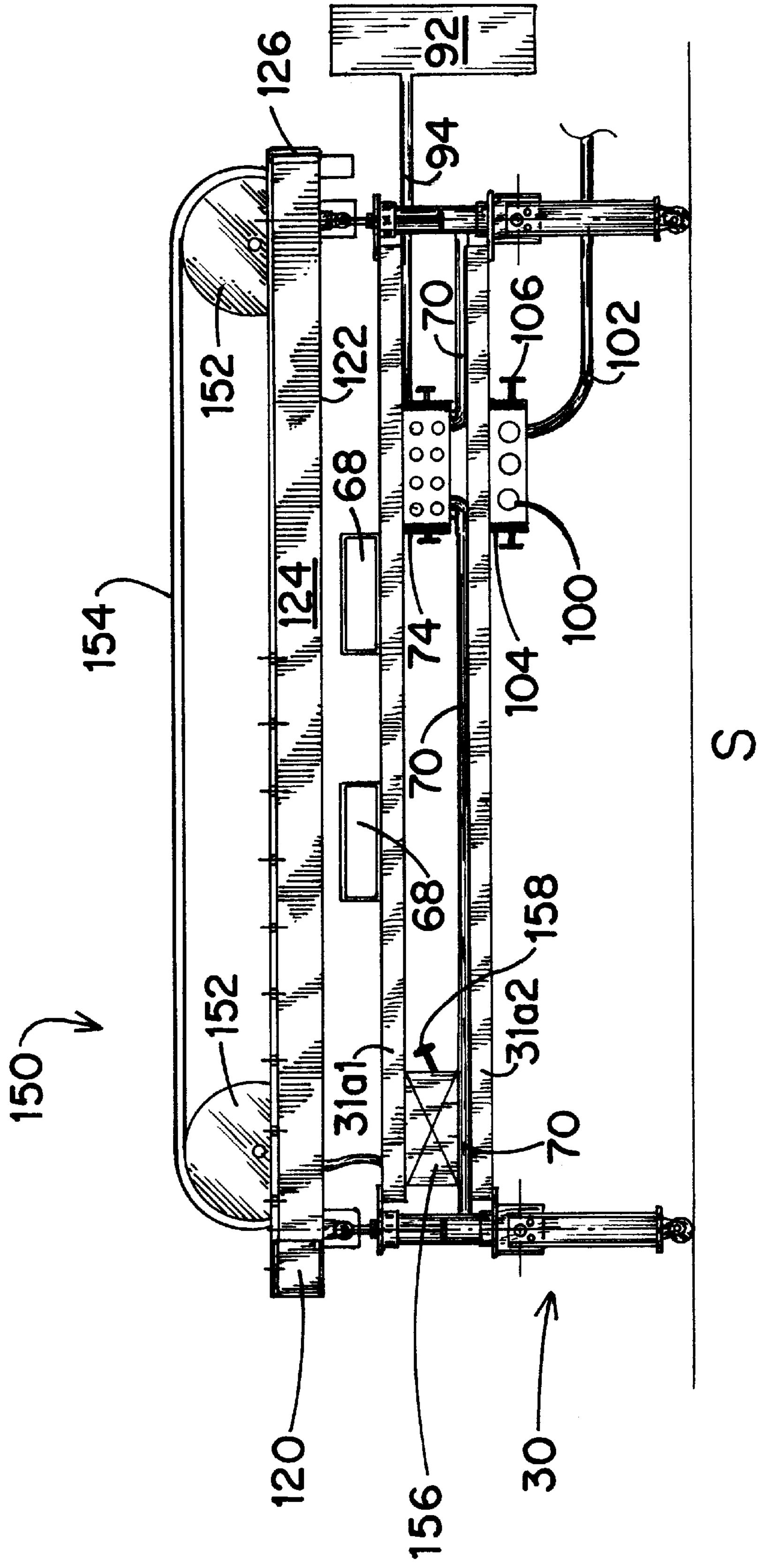
FIG. 10 is a side plan view of a conveyor system mounted on the work surface device.

The pneumatic control device 72, fastened to the bracket members 31, contains individual control switch members 78 adapted for admitting gas to or releasing gas from individual telescoping support members 50. The pneumatic control device 72 is shown in greater detail in FIGS. 7 and 8. Referring to FIG. 7, a front view of the pneumatic control device 72 containing the individual control switch members 78 is shown. A pair of control switch member, 78*a*1 and 78*b*1, is present for each telescoping support member 50, with the pair of switches positioned vertically. In the embodiment shown in FIG. 7, four pairs of control switch members, 78*a*1–4 and 78*b*1–4, are present. Pressing one upper switch, for instance 78*a*2, admits compressed gas to one of the telescoping support member 50, through the flexible conduit member 70. Pressing the corresponding lower switch of the pair, in this case 78*b*2, releases gas from that same telescoping support member 50, again through the flexible conduit member 70. Compressed gas is supplied to each inlet control switch via a common compressed gas manifold channel 80 in the control device body member 81, in turn supplied from the gas inlet connector 82 positioned at one end of the pneumatic control device 72. The interior construction of the pneumatic control device 72 is best seen in FIG. 8, which is a cross sectional view along line C—C of FIG. 7.

The upper control switch member, 78*a,* controls a corresponding inlet tank valve member 84*a,* positioned in communication with the gas inlet manifold channel 80. A supply channel 86*a* in the body member 81 routes the compressed gas to a coupler plug member 88, opposite the control switch 78*a,* connected to a conduit member 70 supplying one telescoping support member 50. The supply channel 86*a* is also in communication with a gas outlet channel 90*a* in the body member 81, controlled by the lower control switch member 78*b*. The outlet channel 90*a* is also in communication with the ambient atmosphere exterior the pneumatic control device 72. Switch member 78*b* maintains the gas outlet channel 90*a* in a closed condition to retain gas therein. Pushing control switch 78*a* introduces compressed gas to the corresponding telescoping support member 50 via the flexible conduit member 70, while pushing the switch member 78*a* opens the outlet conduit, allowing compressed gas to escape from the corresponding telescoping support member 50 via the flexible conduit member 70. The body member 81 of the pneumatic control device 72 is preferably made from block aluminum for ease of machining and durability. Other compositions, such as ferrous based alloys or synthetic resin polymer, are also contemplated for the body of the pneumatic control device 72.

The pneumatic control device 72 is supplied with compressed gas from a compressed gas source 92 via a main gas supply conduit member 94, reversibly attached to the pneumatic control device 72 by the connector member 82. The compressed gas source 92 may be a machine, such as a press, which generates work pieces that are moved to the adjustable work surface device 10. Alternatively, the compressed gas source may be a compressed gas cylinder 96 alone, or a cylinder in combination with a powered compressor pump which compresses the gas. In the case where the compressed gas source 92 is a machine which produces work pieces, disconnecting the gas supply conduit member 94 from the pneumatic control device 72 mounted on the adjustable work surface device 10, and substituting a second adjustable work surface device 10 of similar construction, reduces redundant equipment and speeds production.

The versatility of the described work surface device 10 is further increased by the addition of a second pneumatic control device bracket holder member 74*a* on the side of the work surface device 10 opposite the first bracket member 74. The second bracket member 74*a* allows the pneumatic control device 72 to be move to the opposite side of the work surface device 10 is so desired. The flexible conduit members 70 and 94 allow for this versatility.

Additionally, a machine control device 100, with a control conduit line member 102 from the machine, can be mounted to the work surface device 10 by means of another bracket member 104. The machine control device 100 is held in the bracket member 104 by a lock pin member 106. A similar bracket member 104 mounted on other work surface devices 10 allows interchange of one device 10 for another, with the machine control device 100 simply transferred from one device 10 to another. The machine control member 100 mounted on work surface 10 allows the user to conveniently operate the machine and attend to duties at the work surface device 10.

The advantages of the adjustable work surface device 10 of the present invention are most apparent where the same adjustable work surface device 10 is operated by a number of different users in various locations in a manufacturing facility. Each user is of individual stature, and the height of a given work surface device 10 is not suitable for all users. The capability of the adjustable work surface device 10 of the present invention to adjust in height for each user is unique. The adjustable work surface device 10 can provide a level working surface on an uneven support surface S. Further the work surface device 10 can be adjusted to tilt from side to side, or from front to back at the desire of the user. The tilting of the adjustable work surface device 10 is illustrated in FIG. 3 where both height adjustable leg members 30 at one end of the device 10 are extended to elevate one end of the device, and in FIG. 4 where both leg member 30 at one side of the device are extended to tilt the device to one side. The rotatable attachment of each tie rod member 44 to each bracket member 32 allows the work surface member 20 virtually unlimited adjustment of orientation.

With regard to the work surface member 20, one embodiment thereof is a simple container such as a chute device 120. The chute device 120 has a flat, horizontal bottom work surface 122 to which the height adjustable leg members 30 are attached. The chute device 120 has vertical sides member 124 and vertical end member 126, thereby forming an open top container. The pneumatic control device 72 and machine control member 100 are fastened by brackets, 74 and 104 respectively, to one or more of the bracing members 31 for convenient access by the user. An optional extension surface member 128 is positioned at one end of the chute device 120, with the extension surface member 128 fastened at one edge to the top of the vertical end member 126.

In an alternative embodiment, the work surface device 20 is a conveyor belt device 150. The conveyor belt device 150 is positioned within the chute device 120, with a pair of roller members 152 positioned within the chute device 120 at opposite ends thereof and rotatably secured thereto. The chute device 120 constitutes a planar frame member of the conveyor belt device 150. A continuous belt member 154 encircles the two roller members 152 with the upper surface of the continuous belt member 154 level with the top edge of the chute device 120. A motor device 156 rotates one or more of the roller member 152, thereby causing the belt member 154 to rotate, thus delivering work pieces from one end of the conveyor belt device 150 to the other end thereof. A suitable control switch member 158 for the motor device 156 is present, preferably mounted on one vertical side of the chute device 120.

While the invention has been particularly shown and described with reference to a preferred embodiment thereof, it will be understood by those skilled in the art that various changes in form and details may be made therein without departing from the spirit and scope of the invention.

I claim:

1. An elevational and tilt adjustable work surface device comprising:

(a) a generally planar work surface member with top and bottom sides;

(b) a plurality of at least three height adjusting leg members secured to said bottom side of said work surface member, said height adjusting leg member comprising;

(i) a bracket member secured to the work surface member bottom side;

(ii) a telescoping support member oriented generally perpendicular to the work surface member and pivotally fastened at a support member first end to said bracket member;

(iii) a rigid leg member comprising a rectangular tube member attached to said telescoping support member at a support member second end opposite said bracket member, said rectangular tube member adapted for directly contacting a support surface;

(c) at least three brace members, each brace member fastened between a selected telescoping support member and one adjacent telescoping support member thereby providing a rigid base supporting the work surface member;

(d) a gas supply means connected to said telescoping support member for delivery and release of compressed gas thereto; and (e) individual control means for admitting gas to and releasing gas from said gas supply means connected to said individual telescoping support members, whereby each said height adjusting leg member is independently height adjustable by said individual control means, thereby providing an elevational and tilt adjustable work surface member.

2. The adjustable work surface device according to claim 1 wherein, said rigid leg member is pivotally secured at a first end to said telescoping support member.

3. The adjustable work surface device according to claim 3 wherein, said rigid leg member pivots to an orientation parallel to said work surface member.

4. The adjustable work surface device according to claim 2 further comprising, means for locking the pivotally secured rigid leg member in an orientation perpendicular to said planar work surface member.

5. The adjustable work surface device according to claim 4 wherein said means for locking the rigid leg member is a U-shaped bracket member sized to accept one end of said rigid leg member, said bracket member and rigid leg member having a plurality of apertures for accepting a locking pin member.

6. The adjustable work surface device according to claim 1 further comprising a lockable wheeled castor member secured to a second end of said rigid leg member opposite said telescoping support member second end, said lockable wheeled castor member adapted for directly contacting a support surface.

7. The adjustable work surface device according to claim 1 wherein, said gas supply means comprises individual flexible conduit members connecting each control means with each telescoping support member.

8. The adjustable work surface device according to claim 1, further comprising a compressed gas source reversibly connected to said individual gas control means.

9. The adjustable work surface device according to claim 1 wherein, said individual control means for deliver of compressed gas to said telescoping support member comprises;

(i) a body member having an inlet means for supplying compressed gas thereto, and a plurality of outlet means, each outlet means supplying compressed gas to a selected individual telescoping support member;

(ii) a plurality of pairs of first and second switch means positioned on said body member, said first switch means of each pair for admitting gas to a selected individual telescoping support member, and said second switch means of said pair for releasing gas from said selected individual telescoping support members;

(iii) a gas supply manifold within said body member in communication with said gas inlet means for supplying compressed gas to each of said first switch means;

(iv) a plurality of tank valve members, each valve member operable by one of said first switch means, said valve member controlling admission of compressed gas to one of each outlet means supplying a selected individual telescoping support member; and (v) a plurality of compressed gas vent means, each connected downstream of one of said tank valve members and upstream of one of said outlet means, said compressed gas vent means controlled by one of said second switch means of said pair of switch means for releasing gas therefrom.

10. The adjustable work surface device according to claim 1, wherein said planar work surface member comprises a chute device with horizontal bottom work surface and vertical sides and ends forming an open top container, said chute device used for collecting and transporting work pieces.

11. The adjustable work surface device according to claim 1, wherein said planar work surface member comprises a conveyor system including:

(i) a planar horizontal frame member;

(ii) first and second roller members fastened at opposite ends of the frame member;

(iii) a conveyor belt member encircling said two roller members; and (iv) means for rotating at least one of said roller members thereby causing said conveyor belt member to move about said rollers.

12. The adjustable work surface device according to claim 1 wherein, said individual control means for deliver of compressed gas to said telescoping support member comprises;

(i) a body member having an inlet means for supplying compressed gas thereto, and a plurality of outlet means, each outlet means supplying compressed gas to a selected individual telescoping support member;

(ii) a plurality of pairs of first and second switch means positioned on said body member, said first switch means of each pair for admitting gas to a selected individual telescoping support member, and said second switch means of said pair for releasing gas from said selected individual telescoping support members;

(iii) a gas supply manifold within said body member in communication with said gas inlet means for supplying compressed gas to each of said first switch means;

(iv) a plurality of tank valve members, each valve member operable by one of said first switch means, said valve member controlling admission of compressed gas to one of each outlet means supplying a selected individual telescoping support member; and (v) a plurality of compressed gas vent means, each connected downstream of one of said tank valve members and upstream of one of said outlet means, said compressed gas vent means controlled by one of said second switch means of said pair of switch means for releasing gas therefrom.

13. An elevational and tilt adjustable work surface device comprising:

(a) a generally planar work surface member with top and bottom sides;

(b) a plurality of four height adjusting leg members secured to said bottom side of said work surface member, said height adjusting leg member comprising;

(i) a bracket member secured to the work surface member bottom side;

(ii) a telescoping support member oriented generally perpendicular to the work surface member and pivotally fastened at a support member first end to said bracket member;

(iii) a rigid leg member comprising a rectangular tube member attached to said telescoping support member at a support member second end opposite said bracket member, said rectangular tube member adapted for directly contacting a support surface;

(c) at least four brace members, each brace member fastened between a selected telescoping support member and one adjacent telescoping support member thereby providing a rigid base supporting the work surface member;

(d) a gas supply means connected to said telescoping support member for delivery and release of compressed gas thereto; and (e) individual control means for admitting gas to and releasing gas from said gas supply means connected to said individual telescoping support members, whereby each said height adjusting leg member is independently height adjustable by said individual control means, thereby providing an elevational and tilt adjustable work surface member.

14. The adjustable work surface device according to claim 13 wherein, said rigid leg member is pivotally secured at a first end to said telescoping support member.

15. The adjustable work surface device according to claim 14 wherein, said rigid leg member pivots to an orientation parallel to said work surface member.

16. The adjustable work surface device according to claim 11 further comprising, means for locking the pivotally secured rigid leg member in an orientation perpendicular to said planar work surface member.

17. The adjustable work surface device according to claim 16 wherein said means for locking the rigid leg member is a U-shaped bracket member sized to accept one end of said rigid leg member, said bracket member and rigid leg member having a plurality of apertures for accepting a locking pin member.

18. The adjustable work surface device according to claim 13 further comprising a lockable wheeled castor member secured to a second end of said rigid leg member opposite said telescoping support member second end, said lockable wheeled castor member adapted for directly contacting a support surface.

19. The adjustable work surface device according to claim 13 wherein, said gas supply means comprises individual flexible conduit members connecting each control means with each telescoping support member.

20. The adjustable work surface device according to claim 13, further comprising a compressed gas source reversibly connected to said individual gas control means.

21. The adjustable work surface device according to claim 13, wherein said planar work surface member comprises a chute device with horizontal bottom work surface and vertical sides and ends forming an open top container, said chute device used for collecting and transporting work pieces.

22. The adjustable work surface device according to claim 13, wherein said planar work surface member comprises a conveyor system including:

(i) a planar horizontal frame member;

(ii) first and second roller members fastened at opposite ends of the frame member;

(iii) a conveyor belt member encircling said two roller members; and (iv) means for rotating at least one of said roller members thereby causing said conveyor belt member to move about said rollers.

23. An elevational and tilt adjustable work surface device comprising:

(a) a generally planar work surface member with top and bottom sides;

(b) a plurality of four height adjusting leg members secured to said bottom side of said work surface member, said height adjusting leg member comprising;

(i) a bracket member secured to the work surface member bottom side;

(ii) a telescoping support member oriented generally perpendicular to the work surface member and pivotally fastened at a support member first end to said bracket member;

(iii) a rigid leg member comprising a rectangular tube member attached to said telescoping support member at a support member second end opposite said bracket member, said rectangular tube member adapted for directly contacting a support surface;

(c) at least four brace members, each brace member fastened between a selected telescoping support member and one adjacent telescoping support member thereby providing a rigid base supporting the work surface member;

(d) a gas supply means connected to said telescoping support member for delivery and release of compressed gas thereto; and (e) individual control means for admitting gas to and releasing gas from said gas supply means connected to said individual telescoping support members, said control means comprising;

(i) a body member having an inlet means for supplying compressed gas thereto, and a plurality of outlet means, each outlet means supplying compressed gas to a selected individual telescoping support member;

(ii) a plurality of pairs of first and second switch means positioned on said body member, said first switch means of each pair for admitting gas to a selected individual telescoping support member, and said second switch means of said pair for releasing gas from said selected individual telescoping support members;

(iii) a gas supply manifold within said body member in communication with said gas inlet means for supplying compressed gas to each of said first switch means, (iv) a plurality of tank valve members, each valve member operable by one of said first switch means, said valve member controlling admission of compressed gas to one of each outlet means supplying a selected individual telescoping support member; and (v) a plurality of compressed gas vent means, each connected downstream of one of said tank valve members and upstream of one of said outlet means, said compressed gas vent means controlled by one of said second switch means of said pair ow switch means for releasing gas therefrom, (f) whereby each said height adjusting leg member is independently height adjustable by said individual control means, thereby providing an elevational and tilt adjustable work surface member.

* * * * *